United States Patent
Matsunaga et al.

(10) Patent No.: US 8,019,219 B2
(45) Date of Patent: Sep. 13, 2011

(54) OPTICAL PACKET SWITCHING APPARATUS AND METHOD THEREFOR

(75) Inventors: Koji Matsunaga, Fukuoka (JP); Yutaka Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 804 days.

(21) Appl. No.: 12/045,870

(22) Filed: Mar. 11, 2008

(65) Prior Publication Data

US 2009/0060506 A1    Mar. 5, 2009

(30) Foreign Application Priority Data

Mar. 16, 2007   (JP) .................................. 2007-068522

(51) Int. Cl.
*H04J 14/00* (2006.01)

(52) U.S. Cl. .......................................... 398/53; 398/54

(58) Field of Classification Search .................... 398/53, 398/54

See application file for complete search history.

(56) References Cited

U.S. PATENT DOCUMENTS

2006/0029391 A1 * 2/2006 Yuki et al. ....................... 398/45
2007/0201877 A1 * 8/2007 Epps et al. ...................... 398/154
2007/0223922 A1 * 9/2007 Nakata ............................. 398/52
2010/0142942 A1 * 6/2010 Rhee et al. ....................... 398/25

FOREIGN PATENT DOCUMENTS

JP    2001-53684    2/2001

* cited by examiner

*Primary Examiner* — Nathan Curs
(74) *Attorney, Agent, or Firm* — Katten Muchin Rosenman LLP

(57) ABSTRACT

An optical switch section that switches the path of an optical packet transmitted thereto and outputs the optical packet, and a control section that generates multiple switch control signals in accordance with the destination of an optical packet transmitted thereto, transmits the multiple control signals to the optical switch section through multiple signal transmission lines and controls the ON/OFF states of multiple optical switches are included, and delay measuring means for measuring a difference in delay time among the multiple signal transmission lines is provided. In this case, the control section adjusts the transmission times of the multiple switch control signals such that the difference in delay time measured by the delay measuring means can be cancelled and that the multiple switch control signals transmitted through the multiple signal transmission lines can arrive at the multiple optical switches simultaneously and transmits the multiple switch control signals.

6 Claims, 8 Drawing Sheets

| DELAY CALCULATION VALUE | DELAY SET VALUE |
|---|---|
| 0 | 0.0ns |
| 1 | 1.0ns |
| 2 | 2.0ns |
| 3 | 3.0ns |
| 4 | 4.0ns |
| 5 | 5.0ns |
| 6 | 6.0ns |
| 7 | 7.0ns |
| 8 | 8.0ns |
| 9 | 9.0ns |
| 10 | 10.0ns |

Fig. 8

OPTICAL PACKET SWITCHING APPARATUS AND METHOD THEREFOR

BACKGROUND OF THE INVENTION

1. Field of the Invention

The present invention relates to an optical packet switching apparatus that switches the path of an optical packet transmitted thereto to the destination of the optical packet and transmits the optical packet and an optical switch control method that controls the ON/OFF states of an optical switch included in the optical packet switching apparatus.

2. Description of the Related Art

For avoiding the bottlenecks (limits in band and amount of signal) of electric wiring technologies in signal switching within a high-speed router, the application of an optical packet switch using a wide band characteristic of an optical transmission technology has been studied and has been partially implemented until now. An optical signal is once converted to an electric signal for switching in an optical packet switching system having been adopted until now, and the scale of the switching has been largely extended with the increase in bands. In order to avoid the large extension of the scale of switching, an optical packet switching apparatus has been considered that transmits an input optical packet by switching it with the optical signal as it is, without converting to an electric signal.

FIG. 1 is a diagram showing an example of a conventionally devised optical packet switching apparatus.

An optical packet 20 input to an optical packet switching apparatus 10A through an optical transmission line 31 on the input side is demultiplexed by an optical filter 12 into a header 21 including destination information and data information (payload 22) that is the body of the optical packet 20. The header 21 and payload 22 of the optical packet 20 have different optical wavelengths from each other, and the optical filter 12 uses the difference in wavelength to demultiplex the optical packet into the header 21 and the payload 22.

The header 21 of the optical packet 20 is converted to an electric signal by a photodetector 13 and is input to a switch control signal generating section 14. In the switch control signal generating section 14, switch control signals for switching the ON/OFF states of multiple optical switches provided in an optical switch section 16 are generated in accordance with the destination information in the header 21 and are input to the optical switch section 16.

On the other hand, the payload 22 demultiplexed by the optical filter 12 is input to the optical switch section 16 through an optical coupler 15.

Rendering in FIG. 1 as if there is one input port for simple illustration, multiple input ports and multiple output ports exist in reality (FIG. 3 shows an example having two input ports and two output ports).

The optical packet (payload 22) through the optical coupler 15 is input to the optical switch section 16. Multiple optical switches are provided in the optical switch section 16 for switching the path of an input optical packet. The optical switches are switched between the ON and OFF states in accordance with the switch control signals generated by the switch control signal generating section 14. The optical packet input to the optical switch section 16 passes through the path formed by the optical switch at the ON state among the optical switches, which are switched between the ON and OFF states in accordance with the switch switching signals generated based on the destination of the optical packet in the switch control signal generating section 14, and is output from an optical transmission line 32 on the output side.

FIG. 1 shows three optical packets #1 to #3, which are sequentially input, and schematically illustrates that the switch control signal is turned on, off and on and that the optical packets #1 and #3 are output from the output side while the optical packet #2 is blocked by the optical switch section 16.

Notably, showing in FIG. 1 (and other figures, which will be described later) as if the payload 22 of the optical packet 20 is only output to the optical transmission line 32 on the output side, a new header is added thereto and transmitted in reality by a configuration not shown herein.

When a skew occurs among multiple switch control signals having arrived at the multiple optical switches, a waiting time occurs among the packets, which causes the deterioration of the transfer efficiency, since no proper buffer element (delay element) exist that can hold an optical signal for a while as it is in a case where switching is performed with the optical signal as it is.

Japanese Laid-open Patent Publication No. 2001-53684 discloses a technology that controls the drift of an optical signal, but the technology cannot suppress the skew among switch control signals.

SUMMARY

The present invention was made in view of the situations above, and the object of the present invention is to provide an optical packet switching apparatus including a technology that suppresses the skew among multiple switch control signals that switch the ON/OFF states of multiple optical switches and an optical switch control method that suppresses the skew among multiple switch control signals that switch the ON/OFF states of multiple optical switches and switches multiple optical switches with multiple switch control signals with the suppressed skew.

An optical packet switching apparatus of the present invention for achieving the object is an optical packet switching apparatus that switches the path of an optical packet, which has been transmitted thereto, to the destination of the optical packet for transmission, the apparatus including:

an optical switch section having multiple optical switches, which are turned on or off based on electrical multiple switch control signals and switch the path of the optical packet based on multiple switch control signals; and a control section that extracts and photoelectrically converts a header section describing the destination of an optical packet, which has been transmitted thereto, generates multiple switch control signals in accordance with the destination, transmits the multiple switch control signals to the optical switch section through multiple signal transmission lines and controls the ON/OFF states of the multiple optical switches, wherein the apparatus has delay measuring means for measuring a difference in delay time of signal transmission among multiple signal transmission lines; and the control section adjusts the transmission times of the multiple switch control signals such that the difference in delay time measured by the delay measuring means can be cancelled and the multiple switch control signals transmitted through the multiple signal transmission lines can arrive at the multiple optical switches simultaneously and transmits the multiple switch control signals.

The optical packet switching apparatus of the present invention has the delay measuring means and measures a difference in delay time of signal transmission within multiple signal transmission lines by the delay measuring means. Then, in a stage for actually controlling the ON/OFF states of the optical switches, the transmission times of the multiple switch control signals are adjusted such that the multiple switch control signals to be transmitted through the multiple signal transmission lines can arrive at the multiple optical switches simultaneously, and the multiple switch control signals are transmitted. Thus, the skew among the multiple switch control signals can be suppressed, and the path of an optical packet can be switched at an accurate time.

Here, in the optical packet switching apparatus of the present invention, the delay measuring means preferably includes a synchronization pattern generating circuit that generates a synchronization pattern signal for delay detection and transmits the synchronization pattern signal to multiple signal transmission lines, a synchronization pattern detecting circuit that detects the synchronization pattern signal transmitted through the multiple signal transmission lines, and a delay time calculating circuit that calculates a difference in delay time of signal transmission among multiple signal transmission circuits based on a difference in detected time among the multiple signal transmission lines of the synchronization pattern signal, which is detected by the synchronization pattern detecting circuit.

In this case, the synchronization pattern generating circuit may generate a synchronization pattern signal for delay detection and transmit it to multiple signal transmission lines simultaneously, and the delay time calculating circuit may calculate a difference in delay time of signal transmission among the multiple signal transmission lines by measuring the times from the time when the synchronization pattern signals transmitted from the synchronization pattern detecting circuit through the multiple signal transmission lines are detected to the time when the synchronization pattern signals for all of the multiple signal transmission lines are detected.

Under this configuration, the difference in delay time of signal transmission among multiple signal transmission lines can be calculated easily.

An optical switch control method of the present invention for achieving the object is an optical switch control method that controls the ON/OFF states of multiple optical switches in an optical packet switching apparatus including an optical switch section that has multiple optical switches, which are turned on or off based on electrical multiple switch control signals and switches the path of the optical packet based on the multiple switch control signals and outputs the optical packet and a control section that extracts and photoelectrically converts a header section describing the destination of an optical packet, which has been transmitted thereto, generates multiple switch control signals in accordance with the destination, transmits the multiple switch control signals to the optical switch section through multiple signal transmission lines and controls the ON/OFF states of the multiple optical switches, the method including:

a delay measuring step of measuring a difference in delay time of signal transmission among multiple signal transmission lines; and a control signal transmitting step of adjusting the transmission times of the multiple switch control signals such that the difference in delay time measured by the delay measuring step can be cancelled and the multiple switch control signals transmitted through the multiple signal transmission lines can arrive at the multiple switches simultaneously and transmitting the multiple switch control signals.

Here, in the optical switch control method of the invention, the delay measuring step preferably is a step of generating a synchronization pattern signal for delay detection, transmitting it to multiple signal transmission lines, detecting the synchronization pattern signals transmitted through the multiple signal transmission lines and calculating a difference in delay time of signal transmission among the multiple signal transmission lines based on a difference in detected time among the multiple signal transmission lines of the detected synchronization pattern signal. In this case, the delay measuring step may be the step of calculating a difference in delay time of signal transmission among multiple signal transmission lines by generating a synchronization pattern signal for delay detection, transmitting the synchronization pattern signal to multiple signal transmission lines simultaneously, and measuring the times from the time when the synchronization pattern signals transmitted through multiple signal transmission lines are detected to the time when the synchronization pattern signals for all of the multiple signal transmission lines are detected.

BRIEF DESCRIPTION OF THE DRAWINGS

FIG. 8 is a schematic diagram showing an example of a conversion table.

DESCRIPTION OF THE PREFERRED EMBODIMENTS

Embodiments of the present invention will be described below. The description on operations by an optical packet switching apparatus as an embodiment of the invention here also functions as the description on an optical switch control method as another embodiment of the invention.

Figure 1:
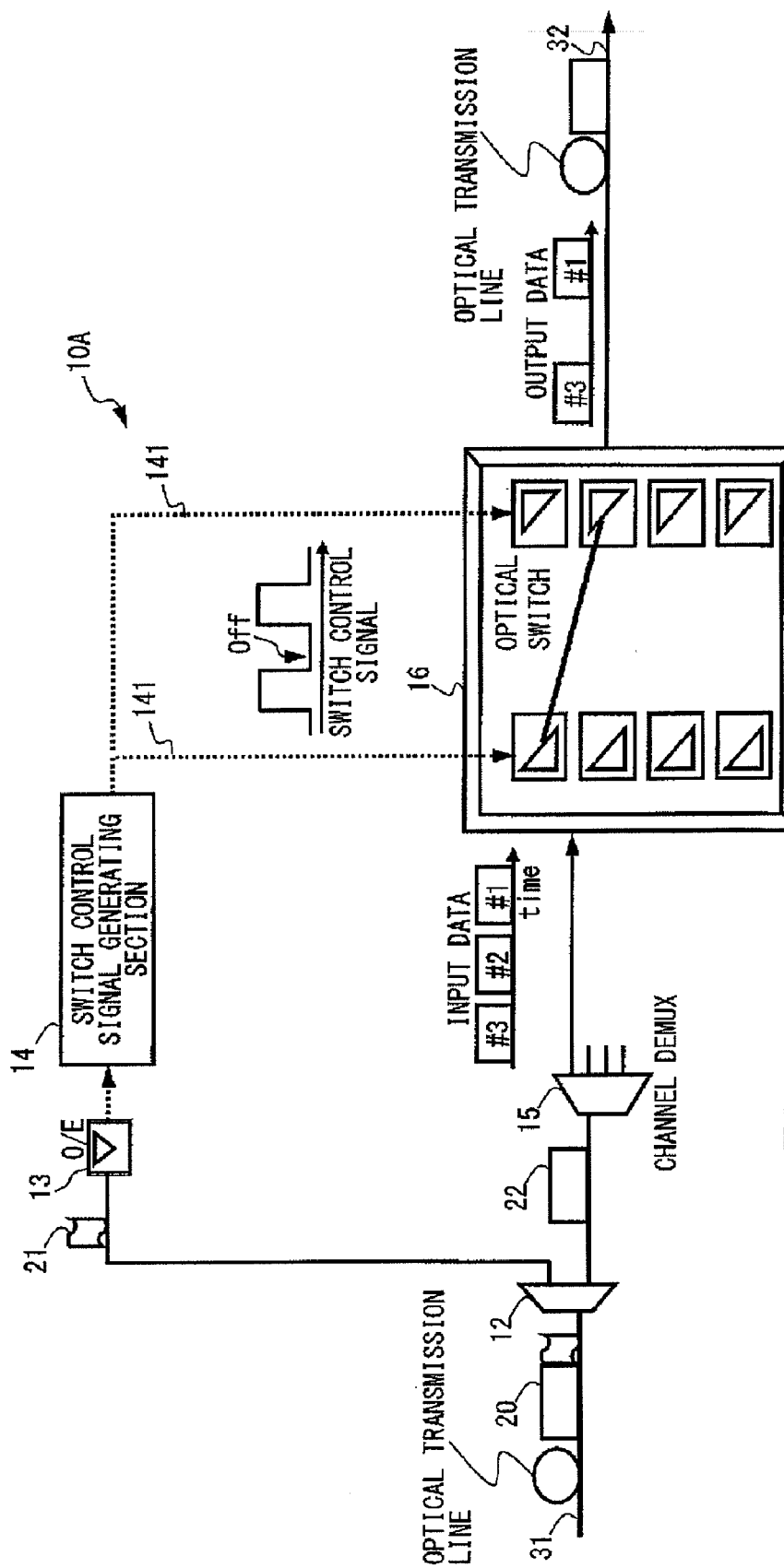
FIG. 1 is a schematic diagram showing an example of a conventionally devised optical packet switching apparatus.
Figure 2:
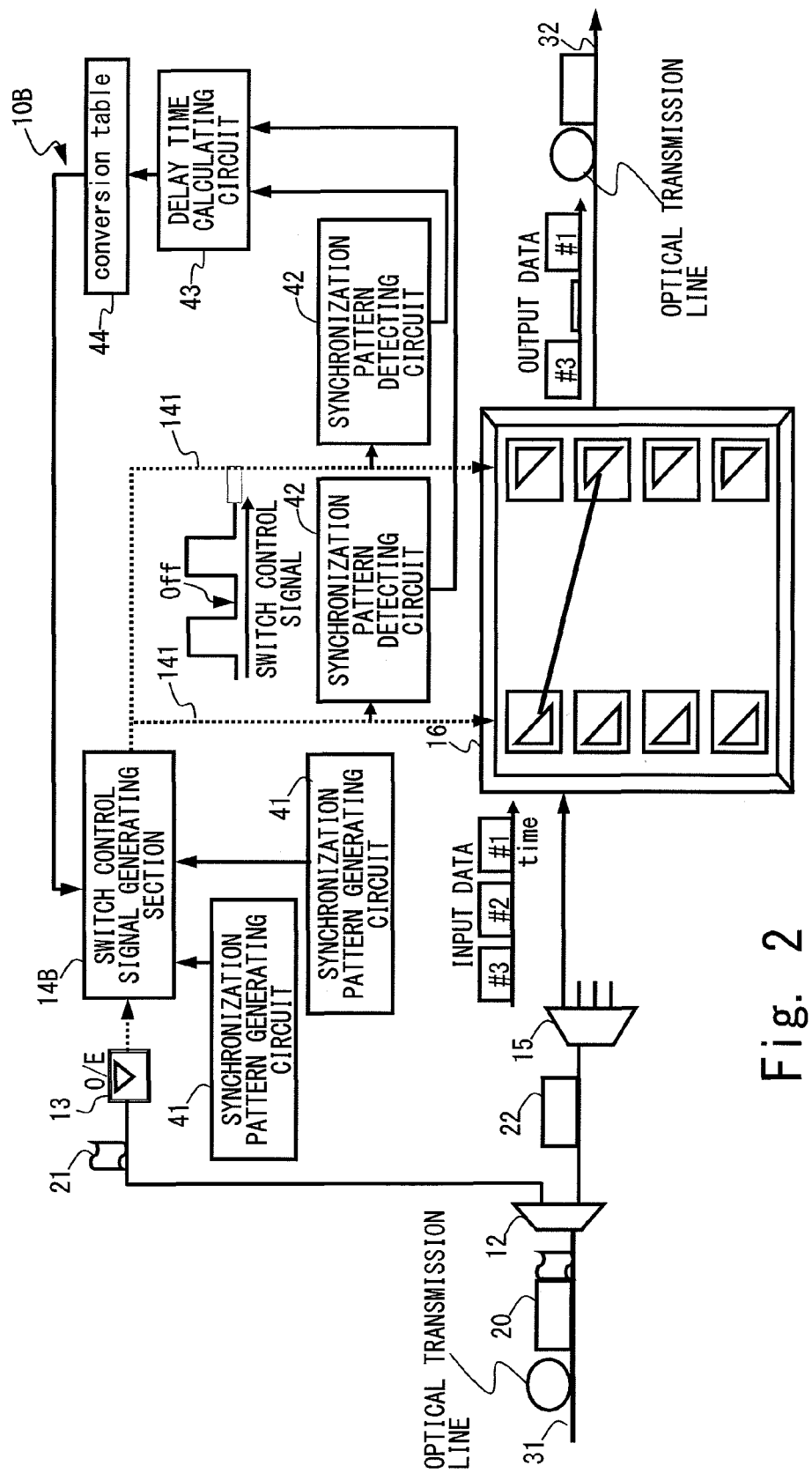
FIG. 2 is a schematic configuration diagram of an optical packet switching apparatus as a first embodiment of the present invention.

FIG. 2 is a schematic configuration diagram of an optical packet switching apparatus as a first embodiment of the present invention. In FIG. 2, the same reference numerals as the reference numerals given in FIG. 1 are given to the same components as the components of the optical packet switching apparatus 10A shown in FIG. 1, and differences will be described.

In comparison with the optical packet switching apparatus 10A in FIG. 1, multiple synchronization pattern generating circuits 41, multiple synchronization pattern detecting circuits 42, a delay time calculating circuit 43, and a conversion table 44 are deployed in an optical packet switching apparatus 10B shown in FIG. 2. Before using the optical packet switching apparatus 10B actually, the synchronization pattern generating circuits 41 generate a synchronization pattern signal for detecting the delay of the signals on signal transmission lines 141, transmit the synchronization pattern signal to a switch control signal generating section 14B and cause the switch control signal generating section 14B to transmit the synchronization pattern signal onto the signal transmission lines 141. The synchronization pattern signal transmitted to the signal transmission lines 141 is detected by each of the synchronization pattern detecting circuits 42 immediately before inputting to the optical switch section 16 (or within the optical switch 16), and the detected times of the synchronization pattern signals in the synchronization pattern detecting circuit 42 are notified to the delay time calculating circuit 43. In the delay time calculating circuit 43, a difference in delay time of signal transmission among multiple signal transmission circuits is calculated based on a difference in detected time among synchronization pattern signals in the synchronization pattern detecting circuits 42. The delay calculation value indicating the difference in delay time calculated by the delay time calculating circuit 43 is converted to a delay set value by the conversion table 44 and is input to the switch control signal generating circuit 14B.

In the switch control signal generating section 14B, the input delay set value is prestored. When the optical packet switching apparatus 10B is actually used, multiple switch control signals that control the ON/OFF positions of multiple optical switches placed in the optical switch section 16 are generated based on the destination information, which is input after converted to an electric signal by the photodetector 13, and the transmission times of the multiple switch control signals to be transmitted through the multiple signal transmission lines 141 are adjusted so as to cancel the skew of the signal transmission among the multiple signal transmission lines 141. Then, the multiple switch control signals are transmitted to the signal transmission lines 141. Thus, the multiple switch control signals arrive simultaneously at the multiple optical switches included in the optical switch section 16, and the ON/OFF states of the multiple optical switches are controlled simultaneously. Therefore, the signals of the optical packet can be switched at an accurate time.

Figure 3:
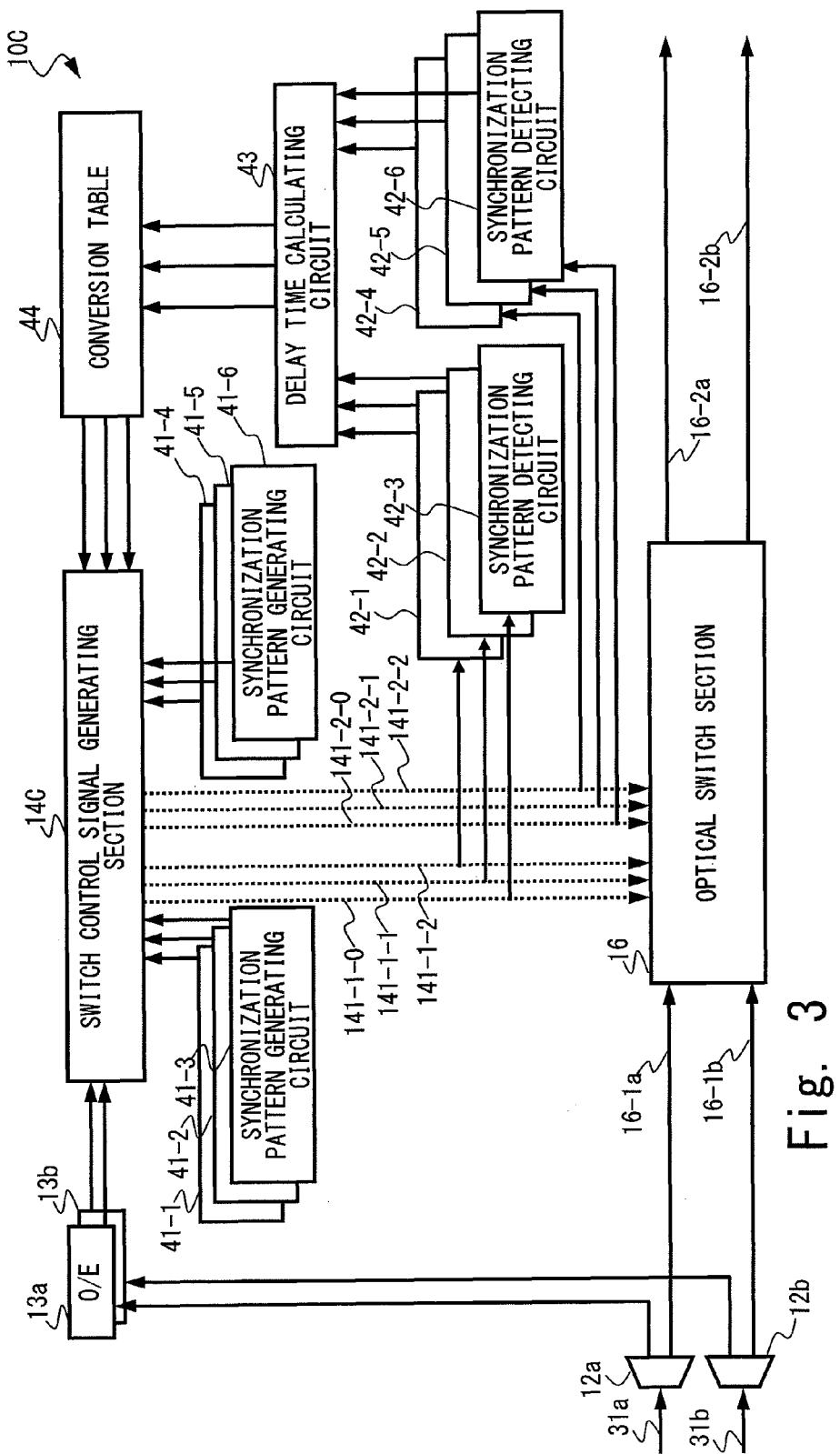
FIG. 3 is a schematic configuration diagram of an optical packet switching apparatus as a second embodiment of the present invention.

FIG. 3 is a schematic configuration diagram of an optical packet switching apparatus as a second embodiment of the present invention.

In comparison with the optical packet switching apparatus 10B of the first embodiment shown in FIG. 2, an optical packet switching apparatus 10C of the second embodiment shown in FIG. 3 is a more specifically illustrated embodiment. The optical packet switching apparatus 10C shown in FIG. 3 includes the optical switch section 16 having two input ports 16-1a and 16-1b and two output ports 16-2a and 16-2b.

Figure 4:
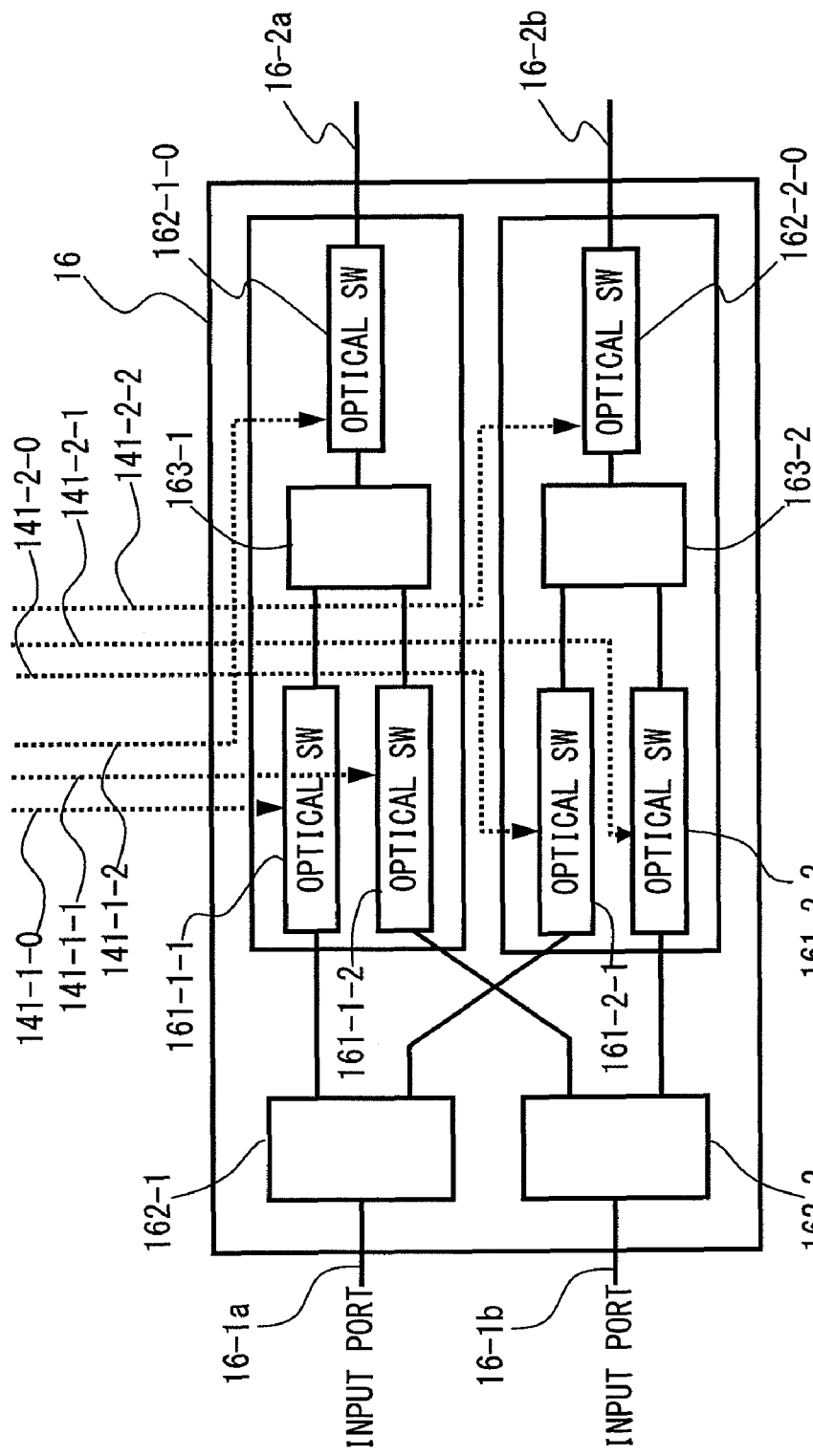
FIG. 4 is a schematic configuration diagram of an optical switch section included in the optical packet switching apparatus shown in FIG. 3.

FIG. 4 is a schematic configuration diagram of the optical switch section 16 included in the optical packet switching apparatus 10C shown in FIG. 3. Now, before entirely describing the optical packet switching apparatus 10C in FIG. 3, the configuration of the optical switch section 16 shown in FIG. 4 will be described.

The optical switch section 16 shown in FIG. 4 includes two input ports 16-1a and 16-1b, two photocouplers 162-1 and 162-2, four upstream optical switches 161-1-1, 161-1-2, 161-2-1 and 161-2-2, two photocouplers 163-1 and 163-2, two downstream optical switches 162-1-0 and 162-2-0 and two output ports 16-2a and 16-2b.

After an optical packet is input from the input port 16-1a of the first channel, the optical packet is divided into two by the photocoupler 162-1, which are then input to the optical switch 161-1-1 of the first channel and the optical switch 161-2-1 of the second channel on the upstream side. Similarly, after an optical packet is input from the input port 16-1b of the second channel, the optical packet is divided into two by the photocoupler 162-2, which are then input to the optical switch 161-1-2 of the second channel and the optical switch 161-2-2 of the second channel on the upstream side. The optical packets input to the two switches 161-1-1 and 161-1-2 of the first channel pass through the optical switches 161-1-1 and 161-1-2 and further pass through the photocoupler 163-1 when the optical switches 161-1-1 and 161-1-2 are at the ON state. When the downstream optical switch 162-1-0 is at the ON state, the optical packets pass through the optical switch 162-1-0 and are output from the output port 16-2a of the first channel.

Similarly, the optical packets input to the two optical switches 161-2-1 and 161-2-2 of the second channel pass through the optical switches 161-2-1 and 161-2-2 and further pass through the photocoupler 163-2 when the optical switches 161-2-1 and 161-2-2 are at the ON position. When the downstream optical switch 162-2-0 is at the ON state, the optical packets pass through the optical switch 162-2-0 and are output from the optical output port 16-2b of the second channel.

Therefore, when the first optical switch 161-1-1 on the input side of the first channel and the optical switch 162-1-0 on the output side of the first channel are at the ON state and when the second optical switch 161-1-2 of the first channel is at the OFF state, the optical packet input from the input port 16-1a of the first channel is output from the output port 16-2a of the first channel. When the second optical switch 161-1-2 on the input side of the first channel and the optical switch 162-1-0 on the output side of the first channel are at the ON state and when the first optical switch 161-1-1 of the first channel is at the OFF state, the optical packet input from the input port 16-1b of the second channel is output from the output port 16-2a of the first channel. Also in the second channel, like the first channel, when the first optical switch 161-2-1 on the input side of the second channel and the optical switch 162-2-0 on the output side of the second channel are at the ON state and when the second optical switch 161-2-2 on the input side of the second channel is at the OFF state, the optical packet input from the input port 16-1a of the first channel is output from the output port 16-2b of the second channel. When the second optical switch 161-2-2 on the input side of the second channel and the optical switch 162-2-0 on the output side of the second channel are at the ON state and when the first optical switch 161-2-1 on the input side of the second channel is at the OFF state, the optical packet input from the input port 16-1b of the second channel is output from the output port 16-2b of the second channel.

In this way, the optical switch section 16 has the two input ports 16-1a and 16-1b and the two output ports 16-2a and 16-2b, and an optical packet input from any one of the two input ports 16-1a and 16-1b can be output from any one of the two output ports 16-2a and 16-2b.

Signal transmission lines 141-1-0, 141-1-1 and 141-1-2; and 141-2-0, 141-2-1 and 141-2-2 extending from the switch control signal generating section 14C shown in FIG. 3 are connected to the optical switches 161-1-1, 161-1-2 and 162-1-0; and 161-2-1, 161-2-2 and 162-2-0. Thus, the ON/OFF states of the optical switches 161-1-1, 161-1-2 and 162-1-0; and 161-2-1, 161-2-2 and 162-2-0 can be controlled by the switch control signals transmitted through the signal transmission lines 141-1-0, 141-1-1 and 141-1-2; and 141-2-0, 141-2-1 and 141-2-2.

Notably, having illustrated the example with two input and output ports for simple description, the same is true for an optical switch having more input and output ports.

Referring back to FIG. 3, the optical packet switching apparatus 10C in FIG. 3 will be further described.

The optical packet switching apparatus 10C has optical transmission lines 31a and 31b of two channels on the input side, and an optical packet is input from each of the optical transmission lines 31*a* and 31*b* of the two channels. The optical packets input from the optical transmission lines 31*a* and 31*b* of the two channels pass through optical filters 12*a* and 12*b* of the two channels. The headers of the optical packets are input to photodetectors 13*a* and 13*b* of the two channels, are photoelectrically converted and are input to the switch control signal generating section 14C.

On the other hand, the payloads of the optical packets through the optical filters 12*a* and 12*b* of the two channels are input to the optical switch section 16 from the input ports 16-1*a* and 16-1*b* of the two channels.

The switch control signal generating section 14C generates switch control signals that turn on and off multiple (six in this example, as shown in FIG. 4) optical switches included in the optical switch section 16 for outputting optical packets to the destinations in the input headers and transmits the switch control signals from the multiple (six here) signal transmission lines 141-1-0, 141-1-1 and 141-1-2; and 141-2-0, 141-2-1 and 141-2-2 to the optical switch section 16. The optical switches 161-1-1, 161-1-2 and 162-1-0; and 161-2-1, 161-2-2 and 162-2-0 within the optical switch section 16 are switched on or off in accordance with the switch control signals transmitted through the signal transmission lines 141-1-0, 141-1-1 and 141-1-2; and 141-2-0, 141-2-1 and 141-2-2. Thus, the paths of the optical packets are formed, and the optical packets (payloads) input to the optical switch section 16 advance on the paths and are output from any one or multiple output ports.

Though the optical packet is output with a new added header as described above, the configuration that adds a new header is omitted herein.

The optical packet switching apparatus 10C shown in FIG. 3 has six synchronization pattern generating circuits 41-1, 41-2, 41-3, 41-4, 41-5 and 41-6, six synchronization pattern detecting circuits 42-1, 42-2, 42-3, 42-4, 42-5 and 42-6, a delay time calculating circuit 43 and a conversion table 44.

Before using the optical packet switching apparatus 10C actually, the synchronization pattern generating circuits 41-1, 41-2, 41-3, 41-4, 41-5 and 41-6 generate synchronization pattern signals for detecting the delay of the signals on the signal transmission lines 141-1-0, 141-1-1, 141-1-2, 141-2-0, 141-2-1 and 141-2-2, transmit the synchronization pattern signals to the switch control signal generating section 14C and cause the switch control signal generating section 14C to transmit the synchronization pattern signals onto the signal transmission lines 141-1-0, 141-1-1, 141-1-2, 141-2-0, 141-2-1 and 141-2-2. The synchronization pattern signals transmitted to the signal transmission lines 141-1-0, 141-1-1, 141-1-2, 141-2-0, 141-2-1 and 141-2-2 are detected by the synchronization pattern detecting circuits 42-1, 42-2, 42-3, 42-4, 42-5 and 42-6 immediately before inputting to the optical switch section 16 (or within the optical switch 16), and the detected times of the synchronization pattern signals in the synchronization pattern detecting circuits 42-1, 42-2, 42-3, 42-4, 42-5 and 42-6 are notified to the delay time calculating circuit 43. In the delay time calculating circuit 43, a difference in delay time of signal transmission among six signal transmission lines is calculated based on a difference in detected time of synchronization pattern signals in the synchronization pattern detecting circuits 42-1, 42-2, 42-3, 42-4, 42-5 and 42-6. The measured value indicating the difference in delay time calculated by the delay time calculating circuit 43 is converted to a delay set value by the conversion table 44 and is input to the switch control signal generating circuit 14C.

In the switch control signal generating section 14C, the delay set value is prestored. When the optical packet switching apparatus 10C is actually used, six switch control signals that control the ON/OFF states of six optical switches 161-1-1, 161-1-2, 162-1-0, 161-2-1, 161-2-2 and 162-2-0 included in the optical switch section 16 are generated based on the destination information, which is input after converted to electric signals by the photodetectors 13*a* and 13*b*, and the transmission times are adjusted so as to cancel the skew of the signal transmission among the six signal transmission lines 141-1-0, 141-1-1, 141-1-2, 141-2-0, 141-2-1 and 141-2-2. Then, the switch control signals are transmitted to the signal transmission lines 141-1-0, 141-1-1, 141-1-2, 141-2-0, 141-2-1 and 141-2-2. Thus, the switch control signals arrive simultaneously at the six optical switches 161-1-1, 161-1-2, 162-1-0, 161-2-1, 161-2-2 and 162-2-0 included in the optical switch section 16, and the ON/OFF states of the six optical switches 161-1-1, 161-1-2, 162-1-0, 161-2-1, 161-2-2 and 162-2-0 are controlled simultaneously.

Figure 5:
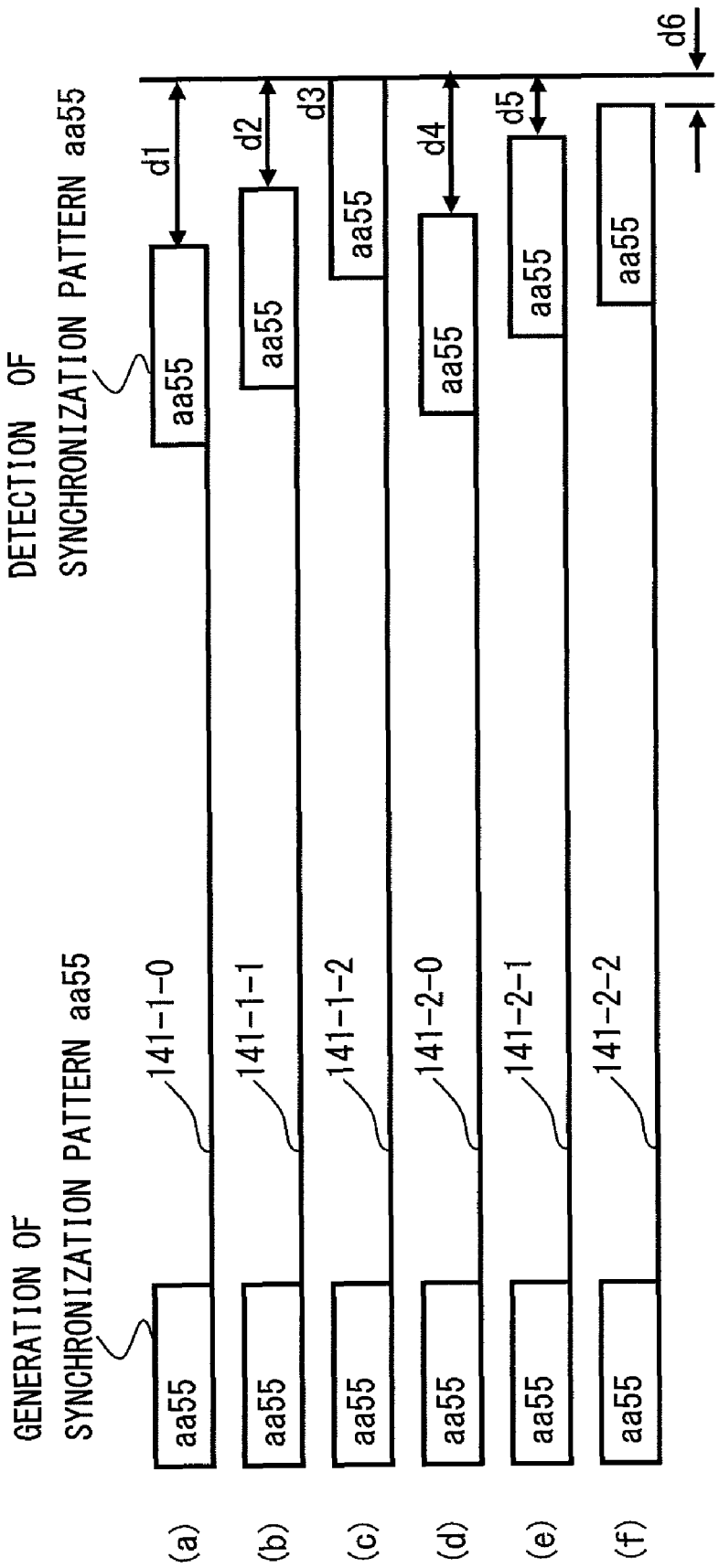
FIG. 5 is an explanatory diagram on the calculation of differences in delay time of signal transmission of six signal transmission lines shown in FIG. 3.

FIG. 5 is an explanatory diagram on the calculation of a difference in delay time of signal transmission among the six signal transmission lines shown in FIG. 3.

The six synchronization pattern generating circuits 41-1, 41-2, 41-3, 41-4, 41-5 and 41-6 shown in FIG. 3 all generate a synchronization pattern "aa55", transmit the synchronization pattern signal representing the same synchronization pattern "aa55" simultaneously to the six signal transmission lines 141-1-0, 141-1-1, 141-1-2, 141-2-0, 141-2-1 and 141-2-2 through the switch control signal generating section 14C. On the other hand, the six synchronization pattern detecting circuits 42-1, 42-2, 42-3, 42-4, 42-5 and 42-6 detect the synchronization pattern signals transmitted through the signal transmission lines 141-1-0, 141-1-1, 141-1-2, 141-2-0, 141-2-1 and 141-2-2 and notify the detected times to the delay time calculating circuit 43.

After receiving the notification of the detection of the synchronization pattern signals from the synchronization pattern detecting circuits 42-1, 42-2, 42-3, 42-4, 42-5 and 42-6, the delay time calculating circuit 43 starts counting the times from the time when the notifications of the detection are received from the synchronization pattern detecting circuits 42-1, 42-2, 42-3, 42-4, 42-5 and 42-6 and counts the times until the time all of the notifications of the synchronization pattern signal detection are received from the six synchronization pattern detecting circuits 42-1, 42-2, 42-3, 42-4, 42-5 and 42-6 (the detection of the synchronization pattern signal transmitted through the signal transmission line 141-1-2 is most delayed in the example shown in (c) of FIG. 5). The times counted for the signal transmission lines 141-1-0, 141-1-1, 141-1-2, 141-2-0, 141-2-1 and 141-2-2 are equal to delay time differences d1, d2, . . . and d6 (where d3=0 in the example described herein) of the signal transmission lines 141-1-0, 141-1-1, 141-1-2, 141-2-0, 141-2-1 and 141-2-2 with reference to the time of the signal transmission line with the largest amount of delay (that is, the signal transmission line 141-1-2 in the example shown in FIG. 5).

Figure 6:
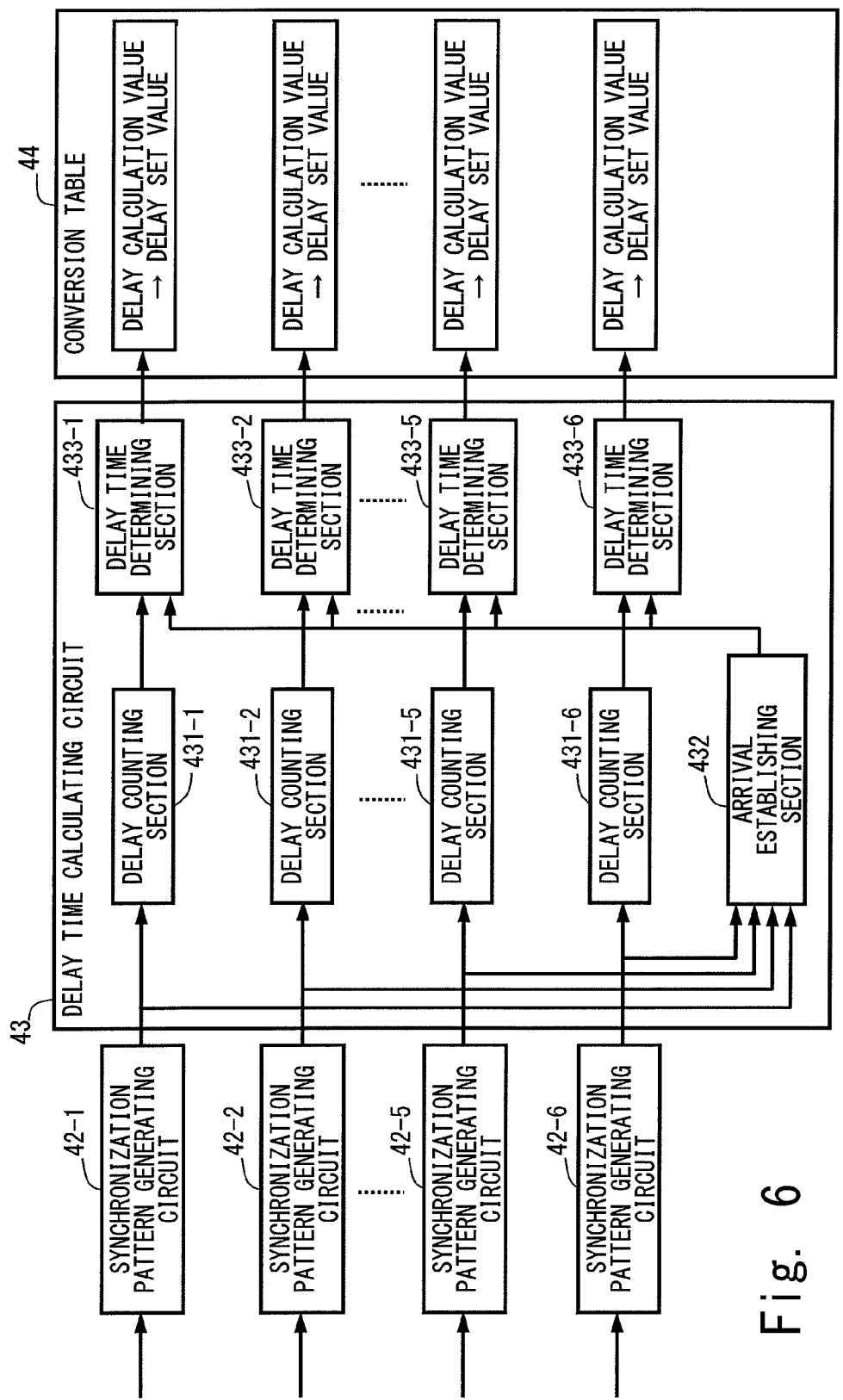
FIG. 6 is a schematic circuit block diagram mainly showing an internal configuration of a delay time calculating circuit.

FIG. 6 is a circuit block diagram mainly showing an internal configuration of the delay time calculating circuit.

When the synchronization pattern signals are detected by the synchronization pattern detecting circuits 42-1, 42-2, 42-3, 42-4, 42-5 and 42-6, the timing signals indicating that the synchronization pattern detection signals have been detected are input to delay counting sections 431-1, 431-2, 431-3, 431-4, 431-5 and 431-6 included in the delay time calculating circuit 43, and the detected time signals from all of the synchronization pattern detecting circuits 42-1, 42-2, 42-3, 42-4, 42-5 and 42-6 are input to an arrival establishing section 432. The delay counting sections 431-1, 431-2, 431-3, 431-4, 431-5 and 431-6 start counting the times from the times when the timing signals of the detection of the synchronization pattern signals are received from the synchronization pattern detecting circuits 42-1, 42-2, 42-3, 42-4, 42-5 and 42-6 and notify the count values to corresponding delay time determining sections 433-1, 433-2, 433-3, 433-4, 433-5 and 433-6.

At the time when the timing signals indicating that the synchronization pattern signals from all of the synchronization pattern detecting circuits 42-1, 42-2, 42-3, 42-4, 42-5 and 42-6 have been detected are all received, the arrival establishing section 432 notifies the fact that all of them have been received to the delay time determining sections 433-1, 433-2, 433-3, 433-4, 433-5 and 433-6. The delay time determining sections 433-1, 433-2, 433-3, 433-4, 433-5 and 433-6 read the time count values of the corresponding delay counting sections 431-1, 431-2, 431-3, 431-4, 431-5 and 431-6 at the time when the notification from the arrival establishing section 432 is received. The time count values read by the delay time determining sections 433-1, 433-2, 433-3, 433-4, 433-5 and 433-6 are equal to the delay calculation values calculated by the delay time calculating circuit 43.

Figure 7:
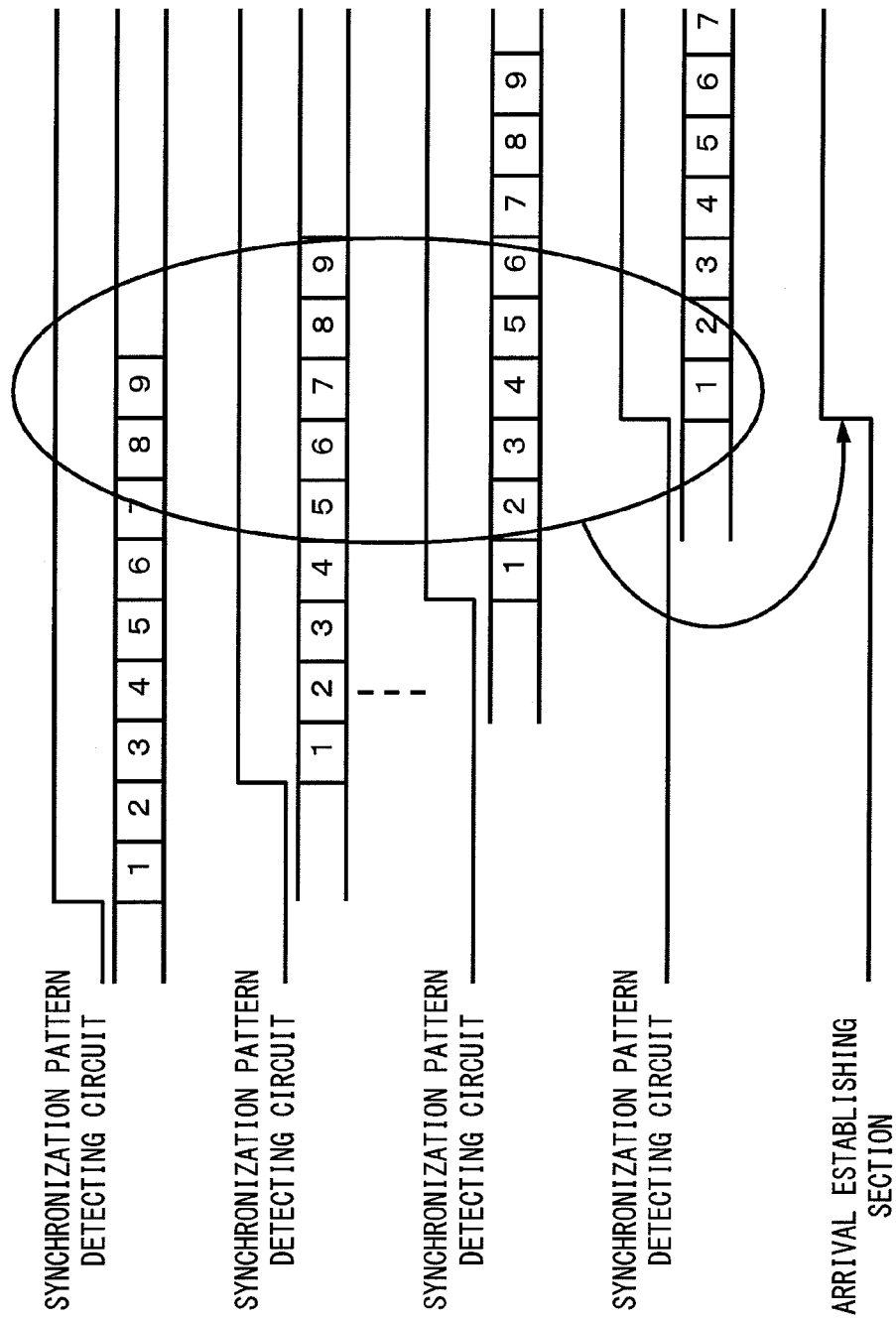
FIG. 7 is an schematic operational explanatory diagram of the delay time calculating circuit shown in FIG. 6.

FIG. 7 is an operational explanatory diagram of the delay time calculating circuit shown in FIG. 6.

The synchronization pattern detecting circuits 42-1, 42-2, 42-3, 42-4, 42-5 and 42-6 upon detection of the synchronization pattern signals change the signals to be transmitted to the delay counting sections 431-1, 431-2, 431-3, 431-4, 431-5 and 431-6 from "L" level to "H" level as shown in FIG. 7. The delay counting sections 431-1, 431-2, 431-3, 431-4, 431-5 and 431-6 start counting the times from the time when the signals transmitted from the synchronization pattern detecting circuits 42-1, 42-2, 42-3, 42-4, 42-5 and 42-6 are changed from "L" level to "H" level. The time count values by the delay counting sections 431-1, 431-2, 431-3, 431-4, 431-5 and 431-6 at the time when the signal from the arrival establishing section 432 rises to "H" level are read by the delay time determining sections 433-1, 433-2, 433-3, 433-4, 433-5 and 433-6. In the example shown in FIG. 7, the delay calculation values by the delay time determining sections 433-1, 433-2, 433-3, 433-4, 433-5 and 433-6 are "9", "7", . . . , "4", and "1".

FIG. 8 is a diagram showing an example of the conversion table.

The conversion table has correspondence between delay calculation values and delay set values. Based on the conversion table, a delay calculation value calculated by the delay time calculating section 43 is converted to the delay set value set in the switch control signal generating section 14C.

Notably, the conversion table shown in FIG. 8 includes a correspondence between a delay calculation value and a delay set value, which is obtained by a simple calculation where the clocks counted by the delay counting sections 431-1, 431-2, 431-3, 431-4, 431-5 and 431-6 are clocks at a frequency of 1.0 GHz. However, for example, the correspondence may be corrected in consideration of the difference between detection points of the synchronization pattern signals on the signal transmission lines 141-1-0, 141-1-1, 141-2, 141-2-0, 141-2-1 and 141-2-2 by the synchronization pattern detecting circuits 42-1, 42-2, 42-3, 42-4, 42-5 and 42-6 and the connection points to the optical switches 161-1-1, 161-1-2, 161-2-1, 161-2-2 and 162-2-0.

Having described the optical packet switching apparatus having inputs and outputs of two channels, the present invention is also applicable to an optical packet switching apparatus having inputs and outputs of more channels.

The delay calculation values obtained by the delay time determining sections 433-1, 433-2, 433-3, 433-4, 433-5 and 433-6 are input to the conversion table 44 and are converted to delay set values, and the delay set values are set in the switch control signal generating section 14C. In generating switch control signals, the switch control signal generating section 14C delays the switch control signals by the set delay set values and transmits them to the signal transmission lines 141-1-0, 141-1-1, 141-1-2, 141-2-0, 141-2-1 and 141-2-2.

According to the present invention as described above, the skew among multiple switch control signals can be suppressed, and an optical packet can be transmitted to the destination of the optical packet by switching the path of the optical path at an accurate time.

What is claimed is:

1. A packet switching apparatus for switching a path of an optical packet to a destination of the optical packet for transmission, the apparatus comprising:
    an optical switch section having a plurality of optical switches, the optical switches being turned on or off on the basis of a plurality of electrical switch control signals for switching the path of the optical packet;
    a control section for extracting data of destination information from a header section of the optical packet and converting the data of destination information into the electrical switch control signals, the control section generating the plurality of electrical switch control signals in accordance with the destination information and transmitting the plurality of electrical switch control signals to the optical switch section through a plurality of signal transmission lines; and
    a delay measuring means for measuring a transmission duration difference between the electrical switch control signal transmission lines from the control section to the optical switching section, wherein the control section adjusts each electrical switch control signal transmitting time so as to decrease the difference.

2. The optical packet switching apparatus according to claim 1, wherein the delay measuring means comprises
    a synchronization pattern generating circuit for generating a synchronization pattern signal for delay detection and transmitting the synchronization pattern signal to the plurality of signal transmission lines; a synchronization pattern detecting circuit for detecting the synchronization pattern signal transmitted through the plurality of signal transmission lines; and
    a delay time calculating circuit for calculating a transmission duration difference between the electrical switch control signal transmission lines from the control section to the optical switching section on the basis of a difference in detected time among the plurality of the signal transmission lines of the synchronization pattern signal.

3. The optical packet switching apparatus according to claim 2, wherein the synchronization pattern generating circuit transmits the synchronization pattern signal to the plurality of the signal transmission lines simultaneously, and the delay time calculating circuit calculates a difference in delay time of signal transmission among the multiple signal transmission lines by measuring the times from when the synchronization pattern transmitted onto the multiple signal transmission lines to when the synchronization pattern for each of the multiple signal transmission lines is detected.

4. An optical switch control method for controlling on or off state of each of multiple optical switches in an optical packet switching apparatus including an optical switch section including a plurality of optical switches, which are turned on or off based on multiple electrical switch control signals and which switch the path of the optical packet, based on the plurality of switch control signals, and output the optical packet, and a control section that extracts and photoelectrically converts a header section describing the destination of the optical packet, which has been transmitted thereto, generates multiple switch control signals in accordance with the destination, transmits the multiple switch control signals to the optical switch section through multiple signal transmission lines and controls on or off states of the plurality of optical switches, the method comprising:

measuring a difference in delay time of signal transmission among the multiple signal transmission lines; and adjusting transmission times of the multiple switch control signals such that the difference in delay time measured by the delay measuring is cancelled such that the multiple switch control signals transmitted through the multiple signal transmission lines arrive at the multiple switches simultaneously; and transmitting the multiple switch control signals.

5. An optical switch control method according to claim 4, wherein the delay measuring includes generating a synchronization pattern signal for delay detection, transmitting it to multiple signal transmission lines, detecting the synchronization pattern transmitted through the multiple signal transmission lines and calculating a difference in delay time of signal transmission among the multiple signal transmission lines based on a difference in detection times among the multiple signal transmission lines of the synchronization pattern.

6. An optical switch control method according to claim 5, wherein the delay measuring includes calculating a difference in delay time of signal transmission among multiple signal transmission lines by generating a synchronization pattern signal for delay detection, transmitting the synchronization pattern signal to the multiple signal transmission lines simultaneously, and measuring the times from when the synchronization pattern is transmitted onto the multiple signal transmission lines to when the synchronization pattern for each of the multiple signal transmission lines is detected.

* * * * *